Figure 1:

Oct. 9, 1928.

W. H. WOOD

RESPIRATOR

Filed Feb. 18, 1925

1,686,592

Inventor

William H. Wood,

By Smith & Freeman

Attorneys

Patented Oct. 9, 1928.

1,686,592

UNITED STATES PATENT OFFICE.

WILLIAM H. WOOD, OF SOUTH EUCLID, OHIO.

RESPIRATOR.

Application filed February 18, 1925. Serial No. 10,140.

This invention relates to respirators and has for its object the provision of new and improved means whereby the entering air can be medicated for disinfecting or germicidal purposes and the expelled air can be rendered aseptic. An example of the former action is afforded by the use of extreme dilutions of chlorine gas in the treatment of colds and other air passage affections, or the use of excess oxygen, particularly in the allotropic form for pulmonary diseases; an example of the latter action is afforded by the use of such a respirator by surgeons and other operatives and also by the use of such a device to prevent spread of infections in homes and schools.

The problem offered by the chlorine treatment is the practical one of affording a substantially uniform, very great, dilution, and difficulties are experienced in all methods which start with pure evolved chlorine owing to the extremely poisonous nature of that gas when concentrated. I have accordingly sought a method whereby a person can apply to nose or face a cloth or porous substance containing a chemical or mixture of chemicals which shall normally be inactive when stored or kept yet become active by contact with the moisture, warmth, or carbon dioxide of the breath or some combination of these and thereupon evolve the gas desired, for example chlorine or oxygen, this evolution being so gradual that the necessary dilution is easily produced.

I have discovered practical and convenient modes of producing both chlorine and oxygen in this manner and have developed simple and convenient apparatus, capable of sale as an article of manufacture, whereby the process may be utilized. For the production of chlorine I impregnate a porous absorbent substance with a mixture of chemicals which are mutually inert when dry but which on contact with moisture and carbon dioxide produce chlorine gas; and I support this absorbent carrier in such position relative to the wearer's nose and face as to obtain the requisite ratio between the area of evolving surface and of air admission ports which serve to dilute the chlorine gas. Such a mixture of chemicals is calcium chloride and calcium hypochlorite. These may be dissolved in water in the proper proportions, preferably about 11 parts of the former to 9 parts of the latter, the absorbent member or a part thereof saturated with the solution, and the whole quickly dried. A still easier way to produce this mixture is to dissolve bleaching powder in water. So long as kept dry these ingredients are inactive and even while wet unless some acid be present. The carbon dioxide and moisture of the breath furnish ideal conditions for the gradual evolution of chlorine desired.

For the production of oxygen I employ a dry mixture of a peroxide compound sometimes with an energizing auxiliary and sometimes alone. Thus I may employ an absorbent member impregnated with sodium peroxide which will evolve oxygen when acted upon by the moisture and carbon dioxide of the breath; or I may employ a peroxide such as that of magnesium which is not decomposed by carbon dioxide (at least with the desired rapidity) and employ with it a suitable organic acid of a type which is inactive when dry but becomes active on moistening with water, such as tannic, tartaric, oxalic, or citric acids or many others.

In order to hold the impregnated absorbent out of contact with the nose and face and control the dilution of the evolved gases I prefer to employ a respirator frame such as is described and claimed in my Patents Nos. 1,502,450 and 1,502,451, issued July 22, 1924, although I am aware that other apparatus can be employed and hence instance these mainly to make a complete disclosure.

Figure 2:
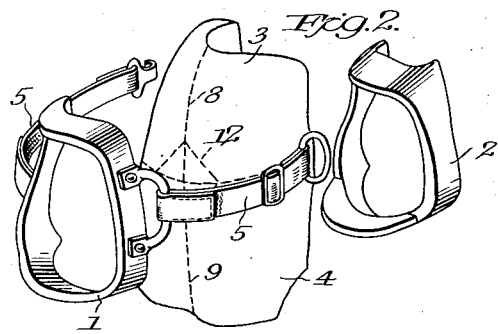
Figure 3:
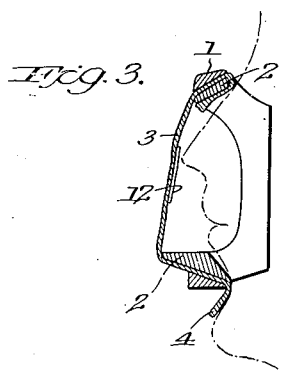
Figure 5:
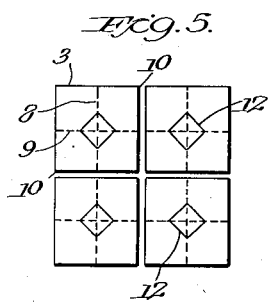
Figure 6:
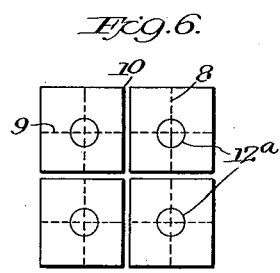
Figure 4:
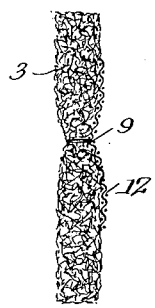
Figure 7:
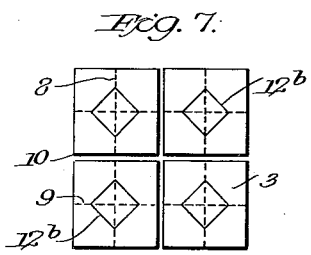
Figure 8:
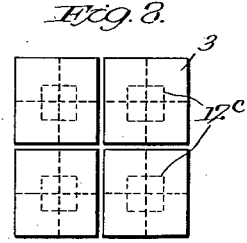

In the drawings accompanying and forming a part of this application I have shown such a respirator devoted to the purposes of the present invention, although it will be understood that these drawings are intended merely to convey the principles of my inventive idea and without limiting function. Fig. 1 illustrates the mode of use of a preferred form of respirator; Fig. 2 is a separated perspective view of the parts of said respirator; Fig. 3 is a sectional view of said respirator showing its relation to the wearer's face; Fig. 4 is a sectional view through a part of the filter material; and Figs. 5, 6, 7, and 8 are views showing the preferred mode of forming these filter devices and medicating the same.

In Figs. 1, 2, and 3 I have shown a respirator of the type set forth in my prior patents above identified and consisting of a pair of interfitting frames 1 and 2 adapted to have a suitable filter member 3 of porous flexible fabric clamped therebetween, the margins of the filter projecting a sufficient distance beyond the frames as shown at 4 to make contact with the wearer's face all around the nose and mouth, thereby compelling all inhalations and exhalations to pass through the filter but without necessitating any such closeness of fit between the frame and face as shall necessitate individual forming or fitting of frames or cause discomfort in the wearing. The inner frame 2 constitutes a distending frame and its purpose is to hold the fabric tightly in the outer frame and at the same time maintain it out of contact with the wearer's nose. The outer frame constitutes a clamping frame and its purpose, aside from cooperating with the inner frame in securing the fabric, is to hold the margins of that fabric against the face and also to constitute a point of attachment for the straps 5 or other fastenings by means of which the device is secured to the wearer's head. In devices which are to be worn all day as for industrial purposes the frames are preferably made of hard rubber or some synthetic wax of similar properties, but for temporary occasional or medicinal use it is possible to make the same of stamped metal or even of wire.

The fabric member can be made of any suitable or desired material, and one very satisfactory material is that loosely woven cotton fabric known as cheesecloth; but an even preferable material consists of a porous layer of the substance known as cotton wadding or cotton batting, provided only that the portion of the same embraced between the frames be reinforced in some manner, as by a layer of cheesecloth or mosquito bar or by being intersected by one or more sewed seams which shall stiffen and strengthen it, keep it from tearing, and prevent it from bulging inwardly and outwardly with changes of pressure.

Medication is effected either by soaking a portion of the fabric member in a solution of the character described, or by rolling the dry ingredients into the meshes of the fabric or by securing thereto a little packet of the reacting substances, or, and this is the preferable manner, a small piece of cloth or other fabric suitably impregnated is fastened to the inner surface of the filter member.

According to the preferred form of my invention these filters are made as shown in Figs. 5 to 8 inclusive by forming rectangular intersecting seams 8 and 9 at regular intervals in a large sheet of cotton wadding, or other porous flexible fabric, and afterwards severing the same into squares by rectangular cuts 10—10. Small pieces of cloth, previously soaked in the substances described and evaporated to dryness are sewed under these seams. These pieces of cloth may take any one of numerous forms. They are preferably made square, since this entails a minimum of waste, and sewed diagonally at the centers of the blanks where the seams 3 and 9 intersect as shown at 12 in Fig. 5; although it is equally possible to make the medicated blanks circular as shown at $12^a$ in Fig. 6; and if a stronger dosage is required the same can readily be effected by using larger blanks as shown at $12^b$ in Fig. 7. It is possible, if desired, to make the blanks of more than one ply of fabric interposing the medicated blanks between them as shown at $12^c$ in Fig. 8; also the blanks may be made in the form of tiny cloth envelopes and filled with the dry ingredients.

The location of this blank in use is directly in front of the nostrils of the wearer where the chemical action described serves to liberate the appropriate gas in a gentle, steady, regular manner so as both to cleanse the air passages of the wearer, and to disinfect the exhalations so as to prevent spread of infectious or communicable diseases.

The filters are made and put out as articles of manufacture, preferably in waxed paper envelopes so as to protect the active ingredients from moisture and atmospheric influences.

The mixture of calcium chloride and calcium hypochlorite herein described serves in conjunction with the carbon dioxide and moisture of the breath to evolve chlorine at a very pleasant and beneficial rate which is maintained for several hours with only a small piece of impregnated cloth, but if for any reason a more powerful reaction is desired the same can be secured by working into or sprinkling upon the impregnated cloth some dry tannic, tartaric, or oxalic acid which when moistened by the breath will greatly accelerate the reaction; or can be substituted for the calcium chloride.

It will be also understood, that I do not, except as specifically recited in certain claims, restrict myself to chlorine generation; I do not, except as claimed, restrict myself to any specified combination or compositions of ingredients; I do not, except as specifically recited in certain claims, limit myself to the use of a respirator frame of the type herein shown, nor indeed to any respirator of the mask type since devices of the tube type can be employed; or the filter employed independently; and in general I desire my several claims read and construed each independently of limitations contained in other claims.

Having thus described my invention what I claim is:

1. A medicating respirator comprising a space-enclosing member adapted to be applied over a respiratory passage, said member having one or more passages therethrough, and a composition of matter located in said space adapted to react with the products of exhalation to produce evolution of a germicidal gas.

2. A respirator comprising a supporting member having a passage therethrough and a dry mixture of calcium hypochlorite and another substance adapted to react therewith in the presence of exhalation products located in said passage in a position to be contacted by such exhalation products.

3. In a respirator, a hollow supporting member having a passage therethrough for inhalation and exhalation products, and a porous member in said passage having portions impregnated with two substances which are inactive when dry but which react with some of the exhalation products to produce a germicidal gas.

4. In a respirator, a hollow supporting member having a passage therethrough for inhalation and exhalation products, and a porous member in said passage having portions impregnated with the dried residue of a solution of bleaching powder.

5. A respirator comprising an enclosing member, adapted to be applied to a part of the face surrounding a respiratory passage, a porous filtering member in said enclosing member, and a composition of matter inside said enclosing member consisting of dry materials which are normally inactive but which react with exhalation products to evolve a germicidal gas.

6. A respirator comprising an enclosing member, adapted to be applied to a part of the face surrounding a respiratory passage, a porous filtering member carried by said enclosing member, and a mixture of dry materials also carried by said enclosing member adapted to react with exhalation products to evolve chlorine gas.

7. A respirator having therein a porous absorbent member part of whose pores are filled with a mixture of dry materials adapted to react with exhalation products to evolve a germicidal gas.

8. A respirator having therein a porous absorbent member part of whose pores are filled with a mixture of dry materials adapted to react with exhalation products to evolve chlorine gas.

9. A respirator having therein a porous absorbent member part of whose pores are filled with a dry mixture of calcium chloride and calcium hypochlorite.

10. A respirator of the mask type comprising, in combination, a frame adapted to make contact with the wearer's face around the mouth and nose, a porous filtering fabric carried by said frame and defining an enclosed region in front of the mouth and nose, and a composition of matter carried by said fabric adapted to react with the exhalation products to evolve a germicidal gas.

11. A respirator of the mask type comprising, in combination, a frame adapted to make contact with the wearer's face around the mouth and nose, a porous filtering fabric carried by said frame and defining an enclosed region in front of the mouth and nose, and a mixture of dry materials carried by said fabric adapted to react with the exhalation products to evolve chlorine gas.

12. A respirator of the mask type comprising, in combination, a frame adapted to make contact with the wearer's face around the mouth and nose, a porous filtering fabric carried by said frame and defining an enclosed region in front of the mouth and nose, and a second piece of fabric carried by said first fabric and impregnated with a composition of matter adapted to react with the exhalation products to evolve a germicidal gas.

13. A respirator of the mask type comprising, in combination, a frame adapted to make contact with the wearer's face around the mouth and nose, a porous filtering fabric carried by said frame and defining an enclosed region in front of the mouth and nose, and a second piece of fabric carried by said first fabric and impregnated with a mixture of calcium hypochlorite and another substance adapted to react therewith in the presence of exhalation products to evolve chlorine gas.

14. A respirator of the mask type comprising, in combination, a frame adapted to make contact with the wearer's face around the mouth and nose, a porous filtering fabric carried by said frame and defining an enclosed region in front of the mouth and nose, and a second fabric carried by said first fabric and having thereon a dried solution of bleaching powder.

15. As an article of manufacture and sale, a filter member for a mask-type respirator comprising a piece of porous flexible fabric and a second piece of fabric fastened thereto and impregnated with a composition of matter adapted to react with exhalation products to evolve a germicidal gas.

16. As an article of manufacture and sale, a filter member for a mask-type respirator comprising a piece of porous flexible fabric and a second piece of fabric fastened thereto and impregnated with a mixture of dry materials adapted to react with exhalation products to evolve chlorine gas.

17. As an article of manufacture and sale, a filter member for a mask-type respirator comprising a piece of porous flexible fabric having portions impregnated with a mixture of calcium hypochlorite and another substance adapted to react therewith in the presence of exhalation products to evolve chlorine gas.

18. As an article of manufacture and sale, a filter member for a mask-type respirator comprising a piece of porous flexible fabric and a second piece of fabric fastened thereto and impregnated with a dried solution of chloride of lime.

19. As an article of manufacture and sale, a filter member for a mask-type respirator comprising a piece of porous flexible fabric having portions impregnated with a mixture of dry ingredients adapted to react with exhalation products to evolve a germicidal gas.

In testimony whereof, I hereunto affix my signature.

WILLIAM H. WOOD.